(12) United States Patent
Rochin Machado et al.

(10) Patent No.: US 11,873,727 B2
(45) Date of Patent: Jan. 16, 2024

(54) SYSTEM AND METHOD FOR HOISTING GAS ENGINE ASSEMBLIES

(71) Applicant: GENERAL ELECTRIC COMPANY, Schenectady, NY (US)

(72) Inventors: Jorge Mario Rochin Machado, Queretaro (MX); David Garza Maldonado, Queretaro (MX); Gerardo Plata Contreras, Queretaro (MX); Maria Isabel Romero Contreras, Queretaro (MX); Claudia Priscila Sandoval Camacho, Queretaro (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 364 days.

(21) Appl. No.: 17/231,817

(22) Filed: Apr. 15, 2021

(65) Prior Publication Data

US 2022/0333504 A1    Oct. 20, 2022

(51) Int. Cl.
*F01D 25/28* (2006.01)
*B66F 7/26* (2006.01)
*F02C 7/20* (2006.01)

(52) U.S. Cl.
CPC .............. *F01D 25/285* (2013.01); *B66F 7/26* (2013.01); *F02C 7/20* (2013.01); *F05D 2220/32* (2013.01); *F05D 2260/02* (2013.01); *F05D 2260/30* (2013.01)

(58) Field of Classification Search
CPC .................................. B66F 7/26; F01D 25/285
See application file for complete search history.

(56) References Cited

U.S. PATENT DOCUMENTS

| 5,911,680 | A  | 6/1999  | Takeoka |
| 5,921,075 | A  | 7/1999  | Shimoyama et al. |
| 6,141,862 | A  | 11/2000 | Matsui et al. |
| 8,607,451 | B2 | 12/2013 | Arase et al. |
| 9,200,565 | B2 | 12/2015 | Myers et al. |
| 9,255,522 | B2 | 2/2016  | Sancewich et al. |
| 9,404,390 | B2 | 8/2016  | Griese et al. |

(Continued)

FOREIGN PATENT DOCUMENTS

| CN | 201660357 U | 12/2010 |
| CN | 202593859 U | 12/2012 |

(Continued)

OTHER PUBLICATIONS

Espacenet, FR 1058551, English Specification (Year: 1954).*

*Primary Examiner* — Courtney D Heinle
*Assistant Examiner* — John S Hunter, Jr.
(74) *Attorney, Agent, or Firm* — Armstrong Teasdale LLP (57) ABSTRACT

A hoist for lifting at least a portion of a gas engine assembly includes a support member including an upper portion, a lower portion, and a connecting portion extending therebetween. The hoist also includes an elongate member coupled to the lower portion of the support member and extending substantially orthogonally to the lower portion, and at least one bracket slidably engaged with the elongate member and axially translatable along a length of the elongate member. In addition, the hoist includes a plurality of linkage members coupled to the at least one bracket, where each linkage member of the plurality of linkage members is configured to attach to at least a portion of the gas engine assembly.

20 Claims, 9 Drawing Sheets

(56) References Cited

U.S. PATENT DOCUMENTS

| | | |
|---|---|---|
| 9,709,276 B2 | 7/2017 | Pankey |
| 10,414,005 B2 | 9/2019 | Klejc et al. |
| 10,428,737 B2 | 10/2019 | Corradi et al. |
| 2012/0159955 A1 | 6/2012 | Shiotani et al. |
| 2016/0265440 A1 | 9/2016 | Jorgensen et al. |
| 2018/0306064 A1 | 10/2018 | Kolvick et al. |

FOREIGN PATENT DOCUMENTS

| | | | |
|---|---|---|---|
| CN | 211366872 U | | 8/2020 |
| FR | 1058551 A | * | 3/1954 |
| JP | 8210642 A | | 8/1996 |
| JP | 10194665 A | | 7/1998 |
| JP | 10231737 A | | 9/1998 |
| JP | 5881474 B2 | | 3/2016 |

* cited by examiner

SYSTEM AND METHOD FOR HOISTING GAS ENGINE ASSEMBLIES

BACKGROUND

The present disclosure relates generally to systems and methods for hoisting a load and, more specifically, to systems and methods for hoisting gas engine assemblies, such as, but not limited to, gas turbine assemblies and gas generator assemblies.

At least some known facilities use gas engine assemblies, such as gas generators, power turbines, and other related components. Such assemblies are physically large and heavy. Despite their physical size and weight, such assemblies may need to be moved or removed for many reasons, including during installation, during inspections, and during scheduled maintenance services, as well as for a variety of other reasons. As can be appreciated, moving such assemblies may be a difficult and time-consuming task.

In addition, in at least some known applications, a variety of lifting tools may be necessary to enable different parts, or different configurations, of a given gas engine assembly to be moved. For example, a first tool may be used to lift a first portion of an engine assembly, such as a gas generator, while a second, different, tool may be required to lift a second portion of the same engine assembly, such as a gas turbine. The need for different tools increases costs, both for the tools themselves and for their validation for use in heavy lifting. Further, many conventional tools, in addition to being specialized, are not configured to enable gas engine assemblies to be positioned laterally within an enclosure. Rather, many conventional lifting tools may require the removal of a top or upper portion of an engine assembly enclosure prior to providing access to and manipulation of an engine assembly contained therein. Removal of the top or upper portion of an enclosure adds time and costs to an inspection or maintenance event, particularly if auxiliary components of the gas engine assemblies are installed on the top or upper portion.

Accordingly, a universal lifting tool, such as a universal engine hoist capable of selectively elevating and lowering different portions of a gas engine assembly, is desirable. Further, an engine hoist capable of positioning different portions of the gas engine assembly within an engine enclosure, without partially dismantling the enclosure, is desirable.

BRIEF DESCRIPTION

In one aspect, a hoist for lifting a gas engine assembly or a portion thereof is described. The hoist includes a support member including an upper portion, a lower portion, and a connecting portion extending therebetween. The hoist also includes an elongate member coupled to the lower portion of the support member and extending substantially orthogonally to the lower portion, as well as at least one bracket slidably engaged with the elongate member and axially translatable along a length of the elongate member. In addition, the hoist includes a plurality of linkage members coupled to the at least one bracket, where each linkage member of the plurality of linkage members is configured to couple to the gas engine assembly or the portion thereof to enable the gas engine assembly or the portion thereof to be selectively lifted.

In another aspect, a bracket for an engine hoist is described. The bracket includes a first side portion including a first plurality of linkage connection points, a second side portion including a second plurality of linkage connection points, and a flange extending along and connecting the first side portion and the second side portion. The bracket also includes a securing member, which includes a flange receiving portion having a slot configured to receive the flange. In addition, the securing member includes a U-shaped receiving portion having opposing legs that define a central cavity arranged to receive an elongate member, where each of the legs has a slot that receives one of the first or second side portions.

In yet another aspect, a method for assembling a hoist for use with a gas engine assembly is described. The method includes providing a support member including an upper portion, a lower portion, and a connecting portion extending therebetween. The method also includes coupling an elongate member to the lower portion of the support member, where the elongate member extends substantially orthogonally to the lower portion. In addition, the method includes slidably engaging at least one bracket with the elongate member, where the at least one bracket is axially translatable along a length of the elongate member. The method also includes coupling a plurality of linkage members to the at least one bracket, where each linkage member of the plurality of linkage members is configured to attach to the gas engine assembly.

DETAILED DESCRIPTION

Embodiments of the present disclosure relate to systems and methods for hoisting a gas engine assembly in one or more configurations, such as with and without an attached power turbine. More particularly, the systems and methods described herein enable hoisting a gas engine assembly having a plurality of different configurations. For example, the hoist may be coupled to a gas engine assembly in a first configuration, in which the gas engine assembly includes both a gas generator and a power turbine. Similarly, the hoist may be coupled to a gas engine assembly in a second configuration, in which the gas engine assembly includes only a gas generator. Moreover, the hoist enables selectively positioning the gas engine assembly, in any configuration, within an enclosure without disassembling or otherwise altering the enclosure. In fact, the hoist is configured to selectively position the gas engine assembly laterally, such as through a side door, within the enclosure.

Figure 1:
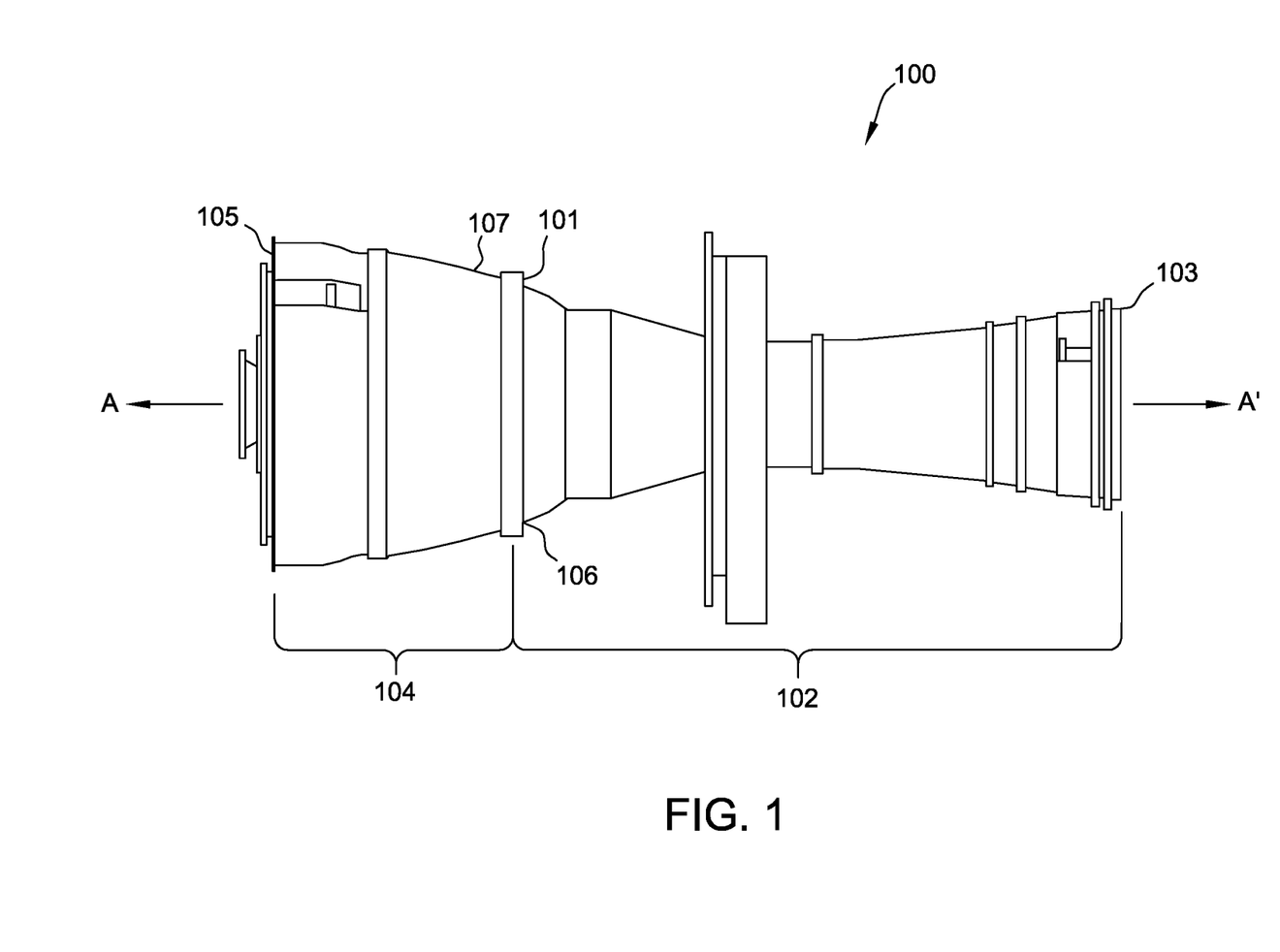
FIG. 1 is a side view of an exemplary gas engine assembly.

FIG. 1 is a side view of an exemplary gas engine assembly 100. As shown, gas engine assembly 100 includes a centerline A-A' and includes a first section, such as a gas generator 102, and a second section, such as a power turbine 104. Gas generator 102 has a forward end 101 and an aft end 103. Likewise, power turbine 104 includes a forward end 105 and an aft end 107. In the exemplary embodiment, aft end 107 of power turbine 104 may be coupled or connected to forward end 101 of gas generator 102 to form gas engine assembly 100.

During installation and maintenance, power turbine 104 may be decoupled from gas generator 102. As a result, it may be desirable to manipulate either gas generator 102 and/or power turbine 104 without manipulating the other. For example, in some cases, it may be desirable to hoist gas generator 102 without hoisting power turbine 104. Likewise, in some cases, it may be desirable to hoist gas engine assembly 100 while gas generator 102 and power turbine 104 remain coupled together.

Figure 2:
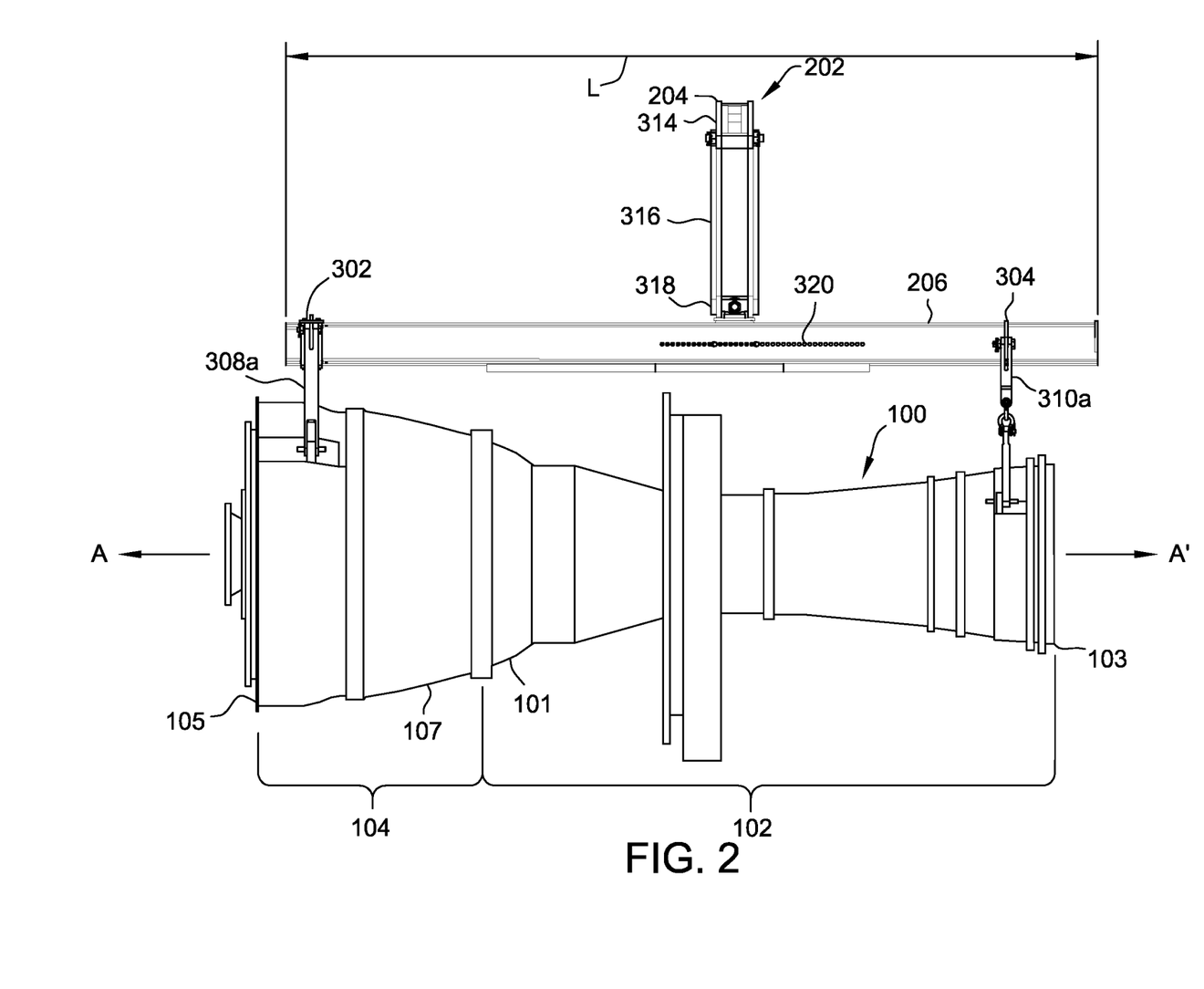
FIG. 2 is a side view of an exemplary hoist that may be used to lift the gas engine assembly shown in FIG. 1, including the gas engine assembly in different configurations, such as with and without a power turbine.
Figure 3:
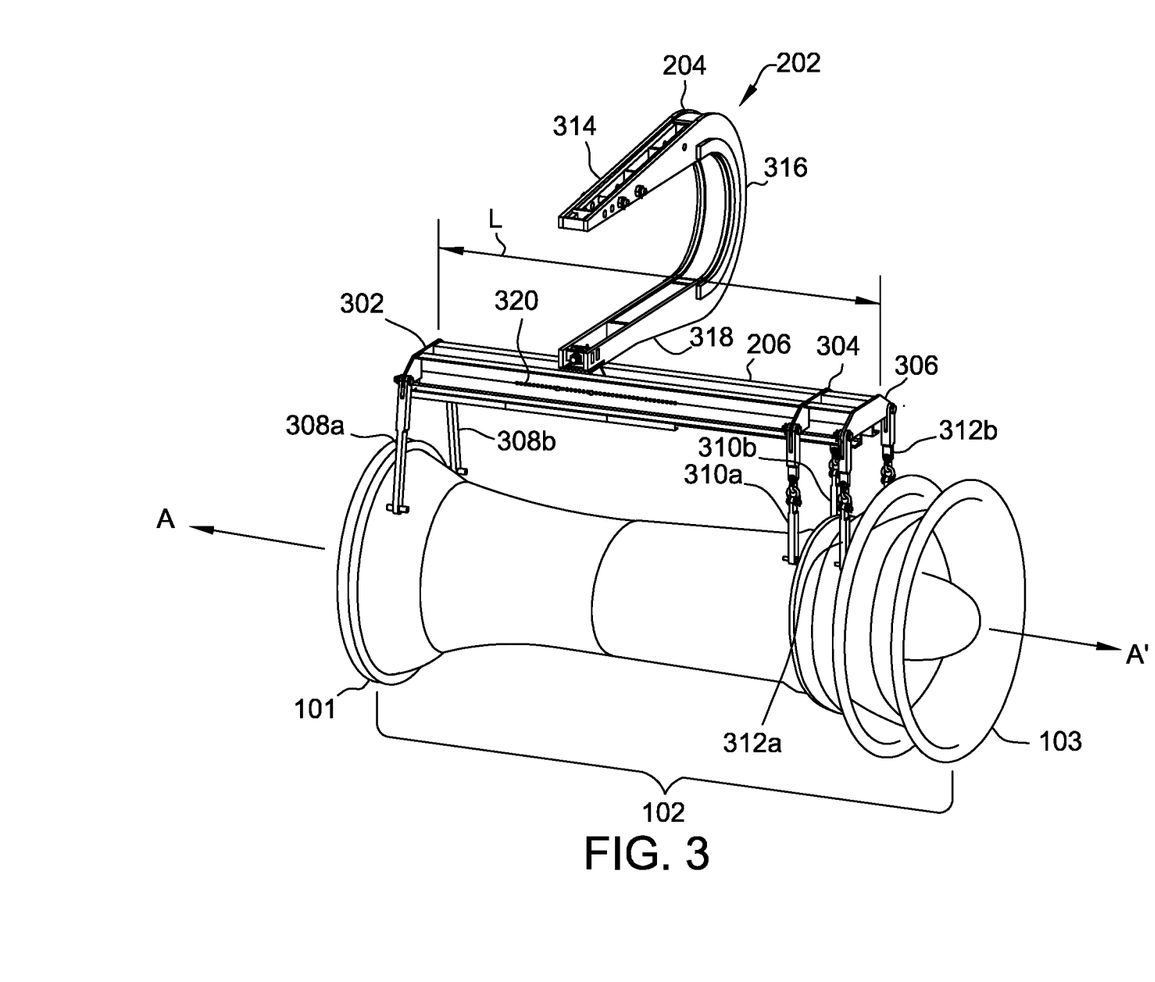
FIG. 3 is a perspective view of the hoist shown in FIG. 2, and illustrates the hoist coupled to a gas generator of the gas engine assembly shown in FIGS. 1 and 2.

FIG. 2 is a side view of gas engine assembly 100 coupled to an exemplary hoist 202 for lifting gas engine assembly 100, including, for example, portions of gas engine assembly 100. Specifically, hoist 202 is operable, as described herein, to lift gas generator 102, power turbine 104, and/or gas engine assembly 100, including while gas generator 102 and power turbine 104 remain coupled together. FIG. 3 is a perspective view of hoist 202 coupled to gas generator 102.

Accordingly, in the exemplary embodiment and with reference to FIGS. 2 and 3, hoist 202 includes a support member 204 and an elongate member 206 having a length, L, coupled to support member 204. In some embodiments, the length L of elongate member 206 is at least the same length as a length of the gas engine assembly 100. Alternatively, in at least some embodiments, the length L of the elongate member may be greater than or less than the length of gas engine assembly 100. In some embodiments, support member 204 may couple to a crane or gantry. Hoist 202 also includes at least one of a first bracket 302, a second bracket 304, and/or a third bracket 306, and at least one of a first plurality of linkage members 308a-b, a second plurality of linkage members 310a-b, and/or a third plurality of linkage members 312a-b. As described in additional detail herein, in at least some embodiments, hoist 202 may exclude support member 204. Specifically, in at least one embodiment, elongate member 206 (or another portion of hoist 202) may be coupled to a crane or gantry without using support member 204.

More particularly, as described in more detail herein, in at least some embodiments (as shown in FIG. 2), hoist 202 may include first bracket 302, second bracket 304, first plurality of linkage members 308a-b, and second plurality of linkage members 310a-b, such as when hoist 202 is coupled to a gas engine assembly 100 including both power turbine 104 and gas generator 102. Similarly, when hoist 202 is coupled only to a portion of gas engine assembly 100, such as to only gas generator 102 (as shown in FIG. 3), an additional third bracket 306 and/or an additional third plurality of linkage members 312a-b may be used. In other embodiments, gas generator 102 may be coupled to hoist 202 using only first bracket 302, second bracket 304, first plurality of linkage members 308a-b, and second plurality of linkage members 310a-b. In some embodiments, more than three brackets 302-306 (and associated linkage members) may be used.

As best shown with reference to FIG. 3, support member 204 includes an upper portion 314, a connecting or central portion 316, and a lower portion 318, wherein central portion 316 extends between and connects upper and lower portions 314 and 318, respectively. In the exemplary embodiment, support member 204 is C-shaped, such that upper portion 314 is substantially elongate, lower portion 318 is substantially elongate, and central portion 316 extends arcuately between portions 314 and 318 to form the C-shape. In some implementations, support member 204 may include a variety of other suitable shapes. For example, in at least some implementations, central portion 316 is rectilinear rather than arcuate.

In the exemplary embodiment, elongate member 206 may be mechanically coupled to lower portion 318 of support member 204, such as by one or more fasteners (e.g., bolts) to extend substantially orthogonally to lower portion 318 and substantially parallel to engine centerline A-A'. To facilitate mechanical coupling, elongate member 206 may include a plurality of support member connection points 320 arranged axially parallel to engine centerline A-A' along elongate member 206. Specifically, support member connection points 320 may be oriented and spaced axially along at least a portion of elongate member 206 to facilitate balanced coupling of elongate member 206 to support member 204. Stated another way, support member 204 may be coupled to elongate member 206 at any connection point 320, depending upon a center of gravity of gas engine assembly 100 (or a portion thereof), to facilitate gas engine assembly 100 remaining balanced when it is coupled to hoist 202.

Figure 4:
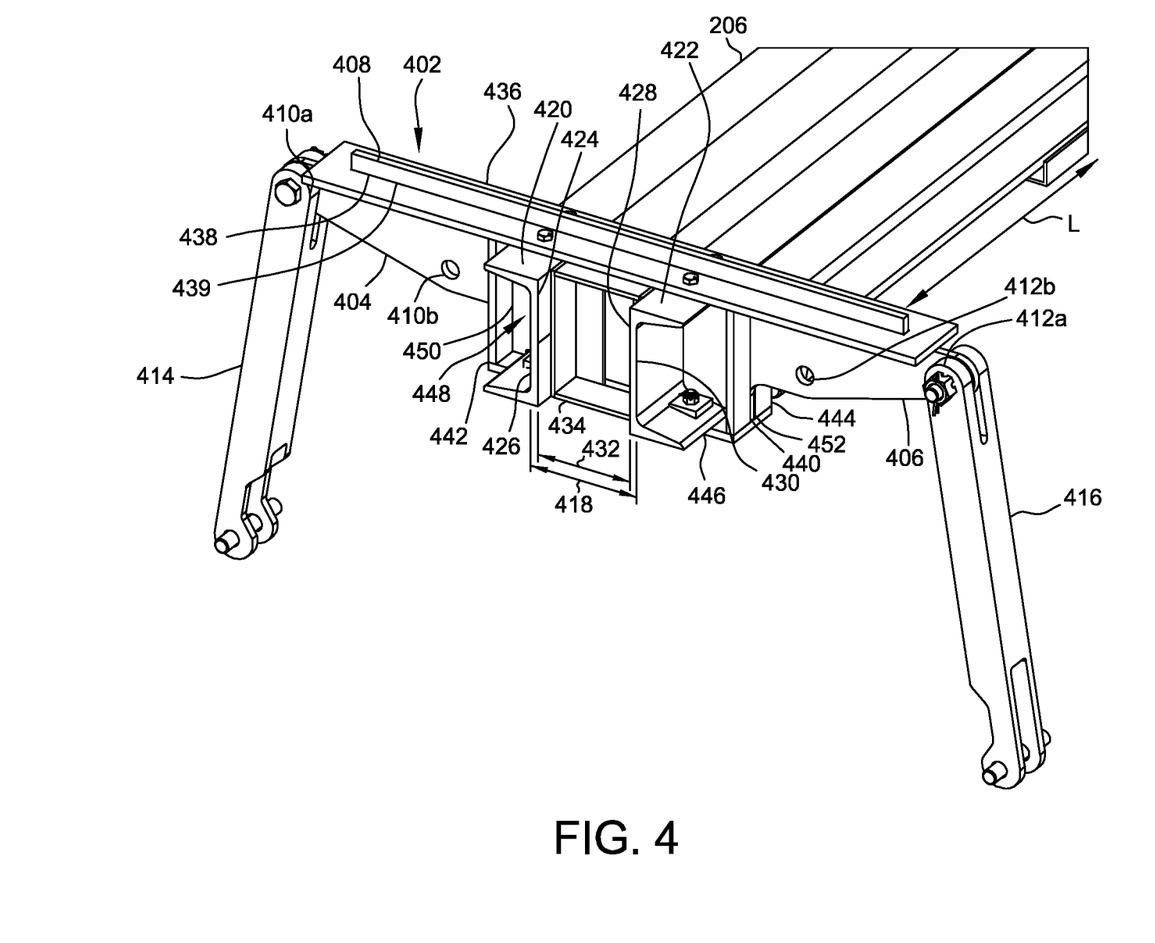
FIG. 4 is a perspective view of a portion of the hoist shown in FIGS. 2 and 3, and illustrates an exemplary bracket used with the hoist.
Figure 5:
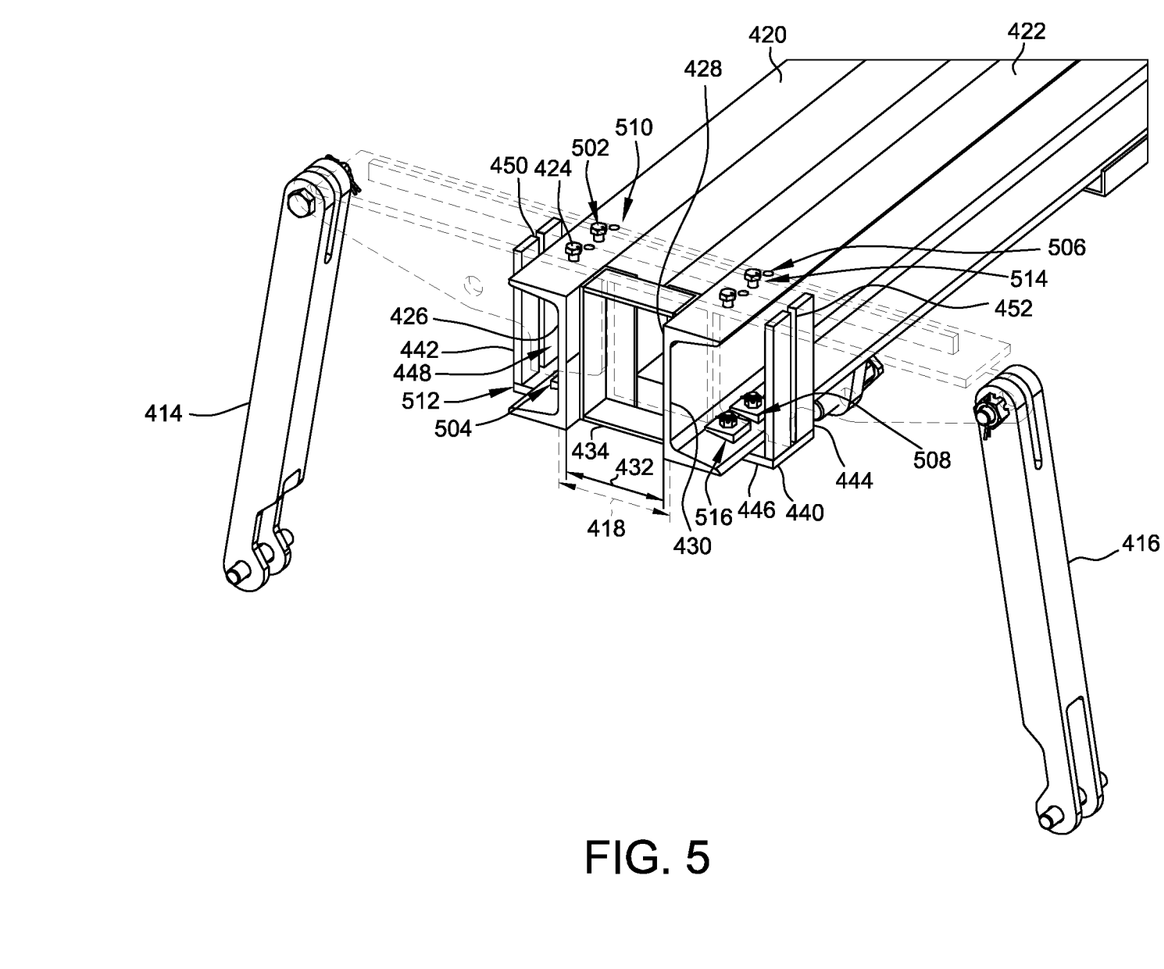
FIG. 5 is a cutaway view of a portion of the hoist shown in FIGS. 2-4, in which the bracket is removed to illustrate additional features.

FIG. 4 is a perspective view of an exemplary bracket 402 that may be used with hoist 202. In the exemplary embodiment, bracket 402 may be any of first bracket 302, second bracket 304, and/or third bracket 306 (or any subsequent bracket if more than three brackets are used). Moreover, in the exemplary embodiment, and as described herein, bracket 402 is engaged with elongate member 206. FIG. 5 is a cutaway view illustrating elongate member 206 and linkage members 414 and 416 that couple elongate member 206 to bracket 402. In FIG. 5, bracket 402 has been removed to illustrate additional features.

Accordingly, with reference to FIG. 4 and FIG. 5, in the exemplary embodiment, bracket 402 includes a first side portion 404, a second side portion 406, and a flange 408 extending along and coupling first side portion 404 with second side portion 406. As can be seen, bracket 402 may be generally "butterfly" shaped (e.g., inasmuch as bracket 402 includes angled or sloping side portions 404 and 406 resembling "wings"), although other shapes are contemplated and within the scope of the present disclosure.

In the exemplary embodiment, bracket 402 includes one or more linkage member connection points, such as a first plurality of linkage member connection points 410a-b and a second plurality of linkage member connection points 412a-b. As shown, one or more linkage members 414 and/or 416 may be pivotably coupled to first plurality of linkage member connection points 410a-b and/or to second plurality of linkage member connection points 412a-b. Linkage members 414 and 416 may be any of first linkage members 308a-b, second linkage members 310a-b, and/or third linkage members 312a-b (or any subsequent linkage members if more than three brackets are used).

Further, in at least some implementations, linkage member connection point 410a may be positioned laterally outward of linkage member connection point 410b. Similarly, linkage member connection point 412a may be laterally outward of linkage member connection point 412b. As described in additional detail herein, these positions may facilitate selectively coupling hoist 202 with any of gas generator 102, power turbine 104, and/or gas engine assembly 100, including in embodiments where gas generator 102 and power turbine 104 are together.

In addition, in the exemplary embodiment, first side portion 404 and second side portion 406 are oriented to define a first gap 418 therebetween that is sized and shaped to receive at least a portion of elongate member 206 in a slidable engagement. More particularly, in at least some embodiments, elongate member 206 may include a first channel-shaped beam 420 and a second channel-shaped beam 422. First channel-shaped beam 420 includes a substantially planar face 424 and a channel portion 426. Similarly, second channel-shaped beam 422 includes a substantially planar face 428 and a channel portion 430.

First channel-shaped beam 420 and second channel-shaped beam 422 are oriented such that faces 424 and 428 and are separated by a second gap 432. A spacer 434 may be positioned within second gap 432. Accordingly, first side portion 404 may slidably engage first channel shaped beam 420, as shown, and second side portion 406 may slidably engage second channel shaped beam 422. As a result, as described in additional detail herein, bracket 402 may slidably engage and translate axially, at least partially, along length L of elongate member 206.

In the exemplary embodiment, bracket 402 also includes a securing member 436. Moreover, in the exemplary embodiment, securing member 436 may include a flange receiving portion 438 having a slot 439 defined therein that is sized and oriented to receive flange 408. In addition, securing member 436 includes a U-shaped receiving portion 440 having a first leg 442 and a second leg 444 opposing first leg 442, and a connecting member 446 extending between and connecting first leg 442 and second leg 444. As shown, first leg 442 and second leg 444 are oriented such that a central cavity 448 is defined therebetween that is sized and oriented to receive elongate member 206 therein in conjunction with first side portion 404 and second side portion 406 of bracket 402. Specifically, in at least some embodiments, first leg 442 includes a first slot 450 that receives first side portion 404, and second leg 444 includes a second slot 452 that receives second side portion 406.

As best shown with reference to FIG. 5, in which bracket 402 is cutaway, bracket 402 may be secured to elongate member 206 via one or more fasteners, such as a first plurality of fasteners 502, a second plurality of fasteners 504, a third plurality of fasteners 506, and/or a fourth plurality of fasteners 508. More particularly, first channel-shaped beam 420 may include a first group or plurality of receiving holes 510 sized to receive first fasteners 502 and a second group or plurality of receiving holes 512 sized to receive second fasteners 504. Similarly, second channel-shaped beam 422 may include a third group or plurality of receiving holes 514 sized to receive third fasteners 506 and a fourth group or plurality of receiving holes 516 sized to receive fourth fasteners 508.

In at least some embodiments, pluralities or groups of receiving holes 510-516 may be oriented to be substantially aligned axially over portions of each channel-shaped beam 420 and 422, such that bracket 402 may be securely coupled to elongate member 206 at one or more suitable axial locations. For example, as shown, each group or plurality of receiving holes 510-516 may, in at least one implementation, include four individual receiving holes. In other embodiments, any other suitable number of receiving holes may be included in each of the groups or pluralities of receiving holes 510-516. As a result, bracket 402 may selectively translate axially, as desired and as described elsewhere herein, to a suitable location relative to elongate member 206. Bracket 402 may also be secured by inserting fasteners 502-508 into respective receiving holes 510-516. Bracket 402 is thus selectively axially translatable relative to elongate member 206 and fixedly couplable or securable to elongate member 206 at a plurality of different locations relative to elongate member 206.

Figure 6:
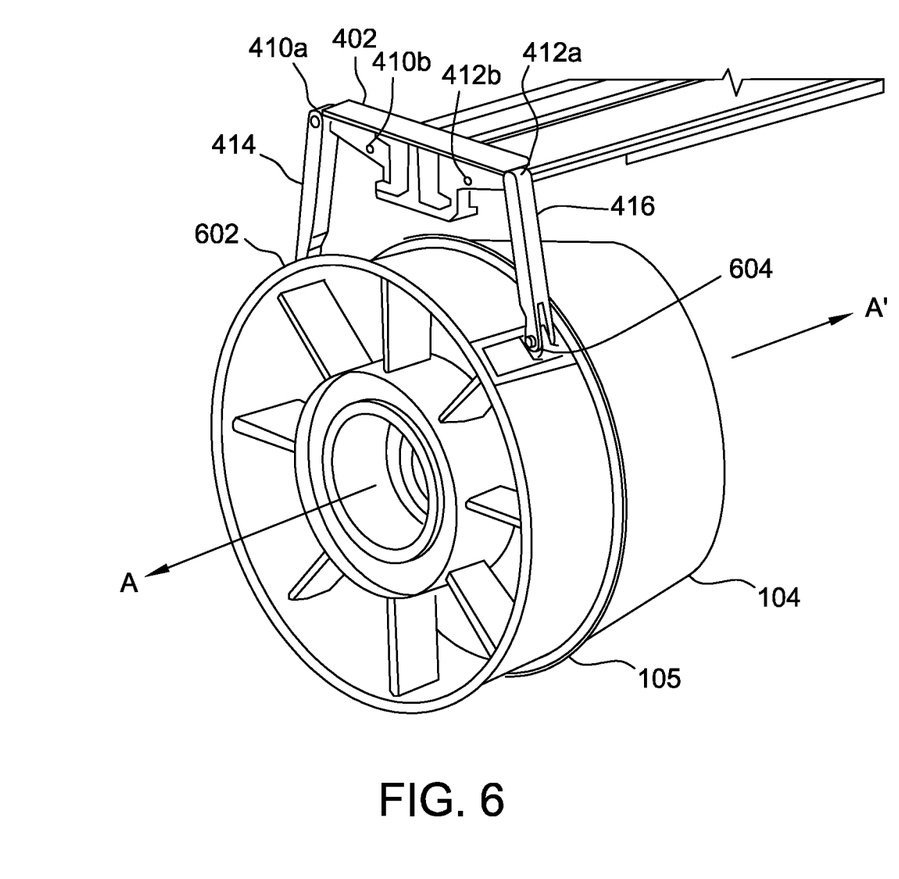
FIG. 6 is a perspective view of a portion of the gas engine assembly shown in FIGS. 1 and 2, in which the hoist is coupled to a power turbine of the gas engine assembly.

FIG. 6 is a perspective view of hoist 202 coupled to a portion of gas engine assembly 100. Specifically, FIG. 6 illustrates a coupling between power turbine 104 of gas engine assembly 100 and bracket 302, which as described above, may be the same as bracket 402. Thus, as shown, power turbine 104 may be coupled to bracket 402 near forward end 105 thereof.

Accordingly, as described herein, during operation, to couple hoist 202 to power turbine 104 of gas engine assembly 100, a first end of linkage member 414 may be coupled to linkage member connection point 410a. Similarly, a first end of linkage member 416 may be coupled to linkage member connection point 412a. As described herein, linkage member connection points 410a and 412a are laterally outward of linkage member connection points 410b and 412b and may be selected to facilitate coupling hoist 202 to power turbine 104, as shown. More particularly, in the exemplary embodiment, linkage member connection points 410a and 412a may accommodate the larger diameter of power turbine 104, as compared to the smaller diameter of gas generator 102.

In addition, a second end of linkage member 414, opposite the first end, may be coupled to a first connection point 602 of power turbine 104, which may be formed integrally with a casing or frame of power turbine 104 (such as by casting) and/or may otherwise be situated on an exterior surface of power turbine 104. Likewise, a second end of linkage member 416 may be coupled, opposite the first end, to a second connection point 604 of power turbine 104, which may be cast in a casing or frame of power turbine 104 and/or otherwise situated on an exterior surface of power turbine 104.

Figure 7:
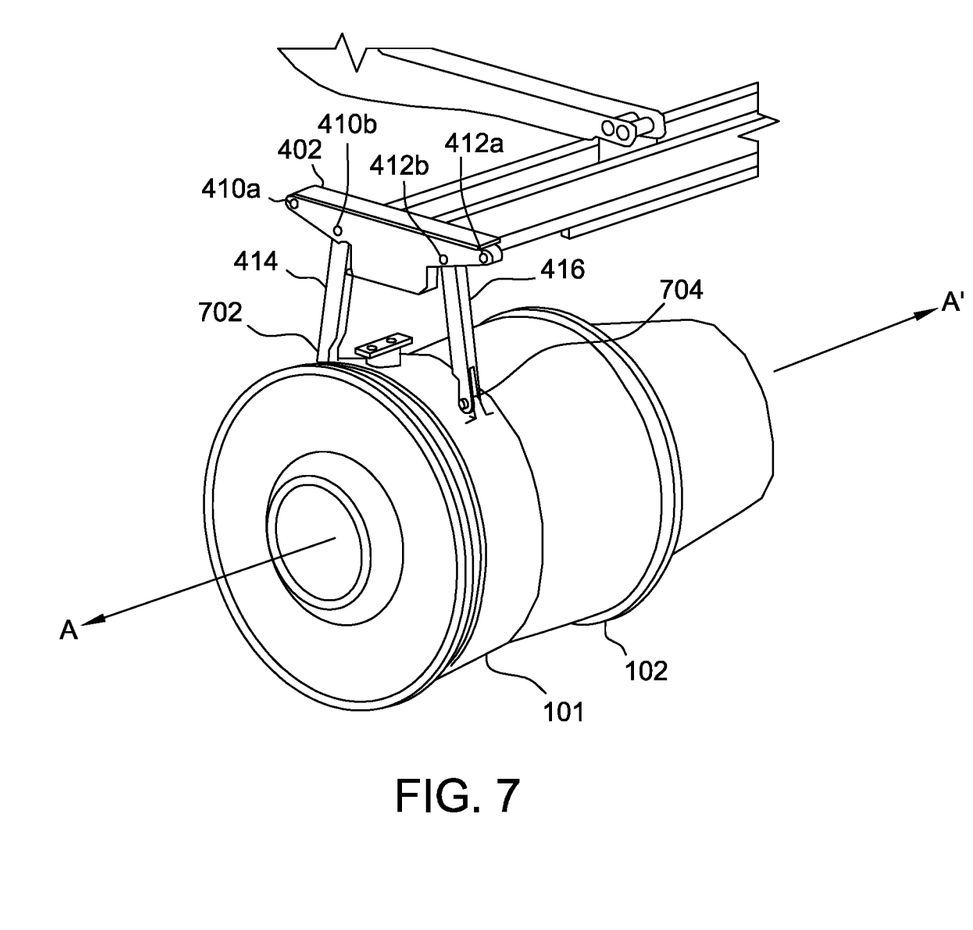
FIG. 7 is a perspective view of a portion of the gas engine assembly shown in FIGS. 1 and 2, in which the hoist is coupled to a gas generator of the gas engine assembly.

FIG. 7 is a perspective view of hoist 202 mechanically coupled to a portion of gas engine assembly 100. Specifically, FIG. 7 illustrates a coupling between gas generator 102 of gas engine assembly 100 and bracket 402. As shown, gas generator 102 may couple to bracket 402 near forward end 101.

Accordingly, as described herein, during use, to couple hoist 202 to only gas generator 102 of gas engine assembly 100, a first end of linkage member 414 may be coupled to linkage member connection point 410b. Similarly, a first end of linkage member 416 may be coupled to linkage member connection point 412b. As described herein, linkage member connection points 410b and 412b are laterally inward of linkage member connection points 410a and 412a and may be selected to facilitate coupling of hoist 202 to gas generator 102, as shown. More particularly, linkage member connection points 410b and 412b may be selected to accommodate the smaller diameter of gas generator 102, as compared to the larger diameter of power turbine 104.

In addition, a second end of linkage member 414, opposite the first end, may be coupled to a first connection point 702 of gas generator 102, which may be cast in a casing or frame of gas generator 102 and/or otherwise situated on an exterior surface of gas generator 102. Likewise, a second end of linkage member 416, opposite the first end, may be coupled to a second connection point 704 of gas generator 102, which may be cast in a casing or frame of gas generator 102 and/or otherwise situated on an exterior surface of gas generator 102.

Moreover, as best shown with returning reference to FIG. 2 and FIG. 3, to facilitate coupling of hoist 202 with either of power turbine 104 and/or gas generator 102, one or more additional brackets, such as brackets 304 and/or 306 may also be coupled, via linkage members 310a-b and/or 312a-b, near aft end 103 of gas generator 102. For example, in at least one embodiment, and as shown in FIG. 2, bracket 304 and linkage members 310a-b may couple to gas generator 102 near aft end 103 to balance and secure gas engine assembly 100 relative to hoist 202.

Similarly, in at least one embodiment, and as shown in FIG. 3, bracket 304, bracket 306, linkage members 310a-b, and linkage members 312a-b may couple to gas generator 102 near aft end 103 to balance and secure gas generator 102 relative to hoist 202. Although in the several illustrated embodiments, a range of two to three brackets 302-306 and corresponding linkage members 308-312 are described, it will be appreciated that any suitable number of brackets and linkage members may be implemented, depending, for example, upon a weight of the object to be hoisted.

As a result, hoist 202 facilitates lifting gas engine assembly 100. Specifically, hoist 202 may be configured or arranged to lift one or more portions of gas engine assembly 100 independently from one another. For example, hoist 202 is operable, as described herein, to lift gas generator 102, power turbine 104, and/or gas engine assembly 100 in its entirety. Hoist 202 may thus function, it will be appreciated, as a universal lifting mechanism for different portions and combinations of gas engine assembly 100.

Figure 8:
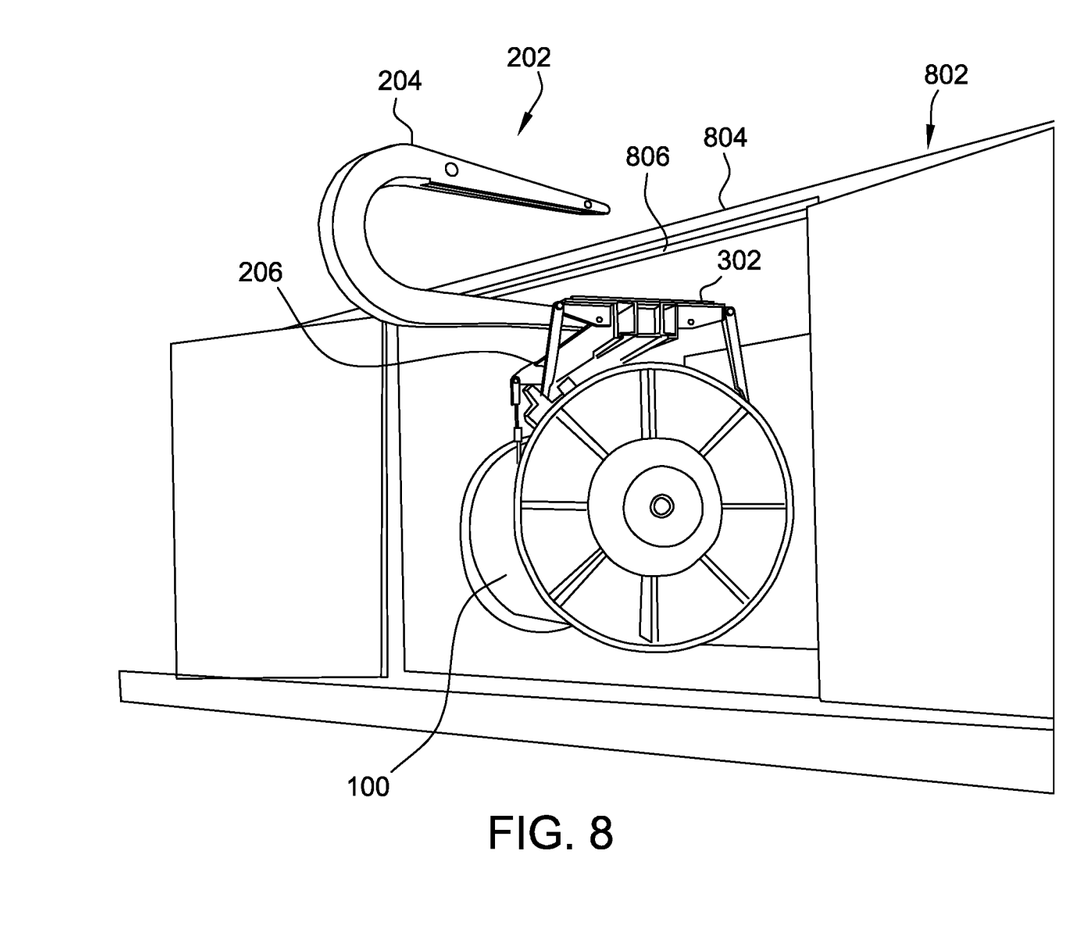
FIG. 8 is perspective view of an exemplary operation of the hoist shown in FIGS. 1-7 to lift and position the gas engine assembly within an enclosure.

FIG. 8 is a perspective view of an exemplary operation of hoist 202 to lift and position gas engine assembly 100 into an enclosure 802. Accordingly, in the exemplary embodiment, in addition to the features described elsewhere herein, one unique advantage of hoist 202 may be that hoist 202 may facilitate positioning gas engine assembly 100 within a structure that includes a top portion 804, such as enclosure 802. More particularly, the C-shape (or similar) of support member 204 may facilitate rotation of gas engine assembly into and/or out of a side door 806 of enclosure 802. As a result, hoist 202 may permit placement of gas engine assembly 100 within enclosure 802 without the necessity of removing top portion 804. This feature may be advantageous in a variety of circumstances, such as when top portion 804 cannot be removed (e.g., because it is integral with the rest of enclosure 802), in tight spaces where it would be cumbersome to remove top portion 804, and the like. Further, although not shown, upper portion 314 of support member 204 may be coupled to and/or suspended from a suitable mechanical frame, such as a gantry and/or another anchor point, such as a ceiling mounted anchor point.

In at least some embodiments, and as described elsewhere herein, hoist 202 may also exclude C-shaped support member 204, which may facilitate a direct connection or coupling between elongate member 206 (and/or another portion of hoist 202) and a support framework, such as a crane or gantry system. In these embodiments, hoist 202 may facilitate straight and/or relatively simplified (e.g., up and down) manipulation of gas engine assembly 100, without the need to rotate gas engine assembly 100 in through a side door 806 of enclosure 802. Thus, in some embodiments, hoist 202 may include support member 204 (e.g., a C-shaped support member 204) for maneuvering and rotating gas engine assembly 100 (or portions thereof) in through side door 806 and other lateral maneuvering. However, in other embodiments, hoist 202 can be reconfigured to exclude support member 204, which may simplify assembly of hoist 202 and which may be suitable for more vertical maneuvering of gas engine assembly 100 or portions thereof.

Figure 9:
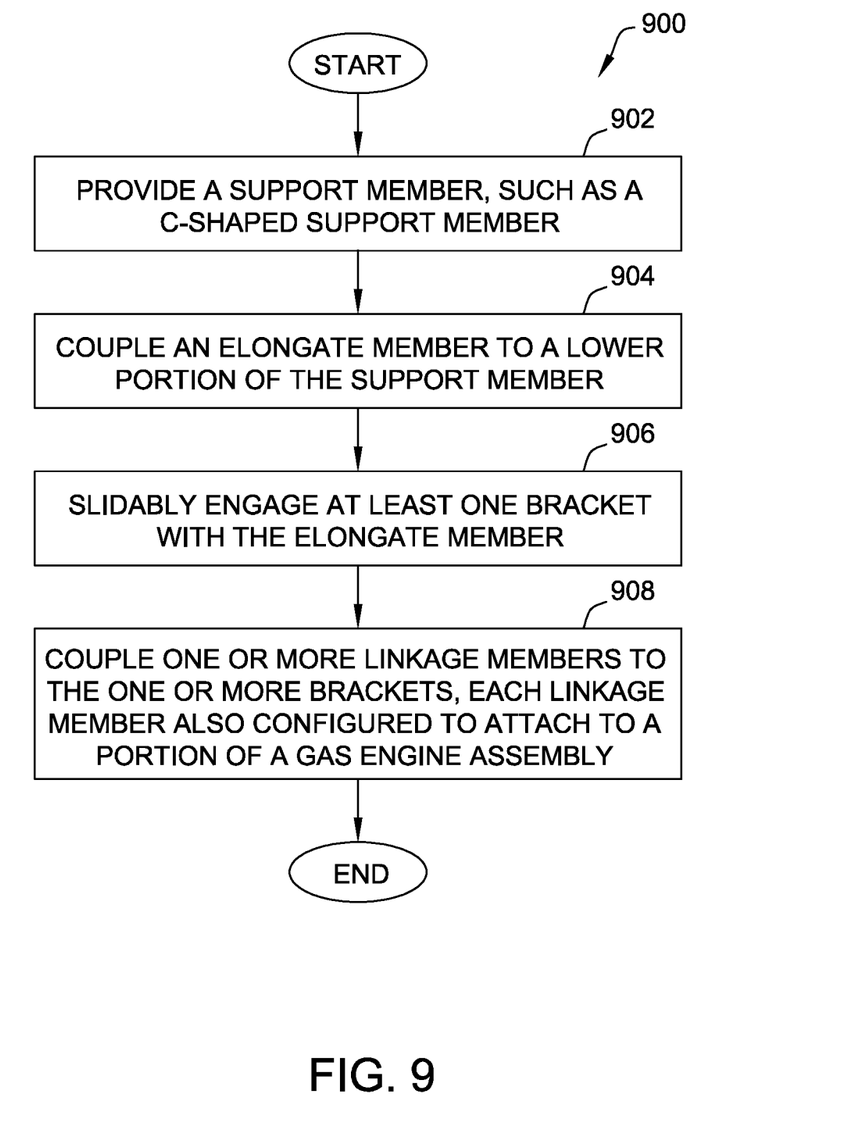
FIG. 9 is a flowchart illustrating an exemplary process for fabricating the hoist shown in FIGS. 2-8.

FIG. 9 is a flowchart illustrating an exemplary process 900 for forming hoist 202. In at least some embodiments, as described in additional detail above, process 900 includes providing 902 support member 204 including upper portion 314, lower portion 318, and central portion 316 extending therebetween. In addition, in the exemplary embodiment, process 900 further includes coupling 904 elongate member 206 to lower portion 318 of support member 204, where elongate member 206 extends, as described herein, substantially orthogonally to lower portion 318. Process 900 may also include slidably engaging 906 at least one bracket 302, 304, and/or 306 with elongate member 206, where the one or more brackets 302, 304, and/or 306 are axially translatable along a length L of elongate member 206 and where the one or more brackets 302, 304, and/or 306 can be mechanically fixed to elongate member 206, once positioned. In addition, in at least some embodiments, process 900 may include coupling 908 one or more of linkage members 308-312 to the one or more brackets 302-306, as described above, where each linkage member 308-312 is configured to attach to gas engine assembly 100.

The systems and methods described herein thus facilitate attachment of a unique hoist to a gas engine assembly in various configurations. For example, the hoist facilitates attachment to a gas engine assembly in a first configuration, in which the gas engine assembly includes both a gas generator and a power turbine. Likewise, the hoist facilitates attachment to a gas engine assembly in a second configuration, in which the gas engine assembly includes only the gas generator or only the power turbine. Moreover, the hoist facilitates positioning the gas engine assembly, in any configuration, within an enclosure without disassembling or otherwise altering the enclosure. Rather, the hoist is arranged to position the gas engine assembly laterally, such as through a side door, within the enclosure.

Further aspects of the present disclosure are provided by the subject matter of the following clauses:

1. A hoist for lifting a gas engine assembly or a portion thereof, the hoist including: a support member including an upper portion, a lower portion, and a connecting portion extending therebetween; an elongate member coupled to the lower portion of the support member and extending substantially orthogonally to the lower portion; at least one bracket slidably engaged with the elongate member and axially translatable along a length of the elongate member; and a plurality of linkage members coupled to the at least one bracket, each linkage member of the plurality of linkage members configured to couple to the gas engine assembly or the portion thereof to enable the gas engine assembly or the portion thereof to be selectively lifted.
2. The hoist of any preceding clause, wherein the connecting portion is arcuate, and the support member is C-shaped.
3. The hoist of any preceding clause, wherein the at least one bracket comprises a first side portion slidably engaged with a first side of the elongate member and a second side portion slidably engaged with a second, opposite side of the elongate member.

4. The hoist of any preceding clause, wherein the first side portion and the second side portion are oriented such that a gap is defined between the first and second side portions, the gap sized and shaped to receive and slidably engage the elongate member.

5. The hoist of any preceding clause, wherein the at least one bracket includes: a first side portion including a first plurality of linkage member connection points; a second side portion including a second plurality of linkage member connection points; and a flange extending along and connecting the first side portion and the second side portion.

6. The hoist of any preceding clause, wherein the at least one bracket further comprises a securing member including: a flange receiving portion including a slot defined therein, the slot being sized and oriented to receive at least a portion of the flange therein; and a U-shaped receiving portion having opposing legs oriented such that a central cavity is defined therebetween, the cavity sized and shaped to receive the elongate member therein, each of the legs also including a slot defined therein that is sized and oriented to receive at least a portion of one of the first or second side portions therein.

7. The hoist of any preceding clause, wherein the at least one bracket comprises a first group of linkage member connection points for hoisting a power turbine of the gas engine assembly, the plurality of linkage members selectively couplable to the at least one bracket at the first group of linkage member connection points.

8. The hoist of any preceding clause, wherein the at least one bracket comprises a second group of linkage member connection points for hoisting a gas generator of the gas engine assembly, the plurality of linkage members selectively couplable to the at least one bracket at the second group of linkage member connection points.

9. The hoist of any preceding clause, wherein the first group of linkage member connection points are laterally outward of the second group of linkage member connection points.

10. The hoist of any preceding clause, wherein the elongate member includes a plurality of support member connection points spaced axially along a portion of the length thereof.

11. The hoist of any preceding clause, wherein the elongate member is selectively couplable to the lower portion of the support member at each of the plurality of support member connection points to facilitate balancing the elongate member relative to the support member.

12. The hoist of any preceding clause, wherein the length of the elongate member is at least the same length as a length of the gas engine assembly.

13. The hoist of any preceding clause, wherein the length of the elongate member is less than a length of the gas engine assembly.

14. A bracket of an engine hoist, the bracket including: a first side portion including a first plurality of linkage connection points; a second side portion including a second plurality of linkage connection points; a flange extending along and connecting the first side portion and the second side portion; and a securing member including: a flange receiving portion having a slot configured to receive the flange; and a U-shaped receiving portion having opposing legs that define a central cavity arranged to receive an elongate member, each of the opposing legs having a slot that receives one of the first or second side portions.

15. The bracket of any preceding clause, wherein the first side portion slidably engages with a first side of the elongate member, and the second side portion slidably engages with a second, opposite side of the elongate member.

16. The bracket of any preceding clause, wherein the first side portion and the second side portion define a gap therebetween, the gap sized and shaped to receive and slidably engage the elongate member.

17. The bracket of any preceding clause, wherein a first group of linkage member connection points is selectively couplable to a first plurality of linkage members, and wherein the first group of linkage member connection points is positioned outward of a second group of linkage member connection points.

18. The bracket of any preceding clause, wherein the U-shaped receiving portion includes at least a first aperture for receiving a first fastener, the first aperture and the first fastener for fixing the bracket in a position relative to the elongate member.

19. The bracket of any preceding clause, wherein the flange receiving portion includes at least a first aperture for receiving a first fastener, the first aperture and the first fastener for fixing the bracket in a position relative to the elongate member.

20. A method for assembling a hoist for use with a gas engine assembly, the method including: providing a support member including an upper portion, a lower portion, and an arcuate portion extending therebetween; coupling an elongate member to the lower portion of the support member, the elongate member extending substantially orthogonally to the lower portion; slidably engaging at least one bracket with the elongate member, the at least one bracket being axially translatable along a length of the elongate member; and coupling a plurality of linkage members to the at least one bracket, each linkage member of the plurality of linkage members configured to attach to the gas engine assembly.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hoist for lifting a gas engine assembly or a portion thereof, the hoist comprising:
a support member including an upper portion, a lower portion, and a connecting portion extending therebetween, wherein the connecting portion is arcuate;
an elongate member coupled to the lower portion of the support member and extending substantially orthogonally to the lower portion;
at least one bracket slidably engaged with the elongate member and axially translatable along a length of the elongate member, the bracket comprising opposing legs oriented such that a central cavity is defined therebetween, the cavity sized and shaped to receive the elongate member therein; and
a plurality of linkage members coupled to the at least one bracket, each linkage member of the plurality of linkage members configured to couple to the gas engine assembly or the portion thereof to enable the gas engine assembly or the portion thereof to be selectively lifted.

2. The hoist of claim 1, wherein the support member is C-shaped.

3. The hoist of claim 1, wherein the at least one bracket comprises a first side portion slidably engaged with a first side of the elongate member and a second side portion slidably engaged with a second, opposite, side of the elongate member.

4. The hoist of claim 3, wherein the first side portion and the second side portion are oriented such that a gap is defined between the first and second side portions, the gap sized and shaped to receive and slidably engage the elongate member.

5. The hoist of claim 1, wherein the at least one bracket comprises:
a first side portion including a first plurality of linkage member connection points;
a second side portion including a second plurality of linkage member connection points; and
a flange extending along and connecting the first side portion and the second side portion.

6. The hoist of claim 5, wherein the at least one bracket further comprises a securing member including:
a flange receiving portion including a slot defined therein, the slot being sized and oriented to receive at least a portion of the flange therein; and
a U-shaped receiving portion having opposing legs oriented such that a central cavity is defined therebetween, the cavity sized and shaped to receive the elongate member therein, each of the legs including a slot defined therein that is sized and oriented to receive at least a portion of one of the first or second side portions therein.

7. The hoist of claim 1, wherein the at least one bracket comprises a first group of linkage member connection points for hoisting a power turbine of the gas engine assembly, the plurality of linkage members selectively couplable to the at least one bracket at the first group of linkage member connection points.

8. The hoist of claim 7, wherein the at least one bracket comprises a second group of linkage member connection points for hoisting a gas generator of the gas engine assembly, the plurality of linkage members selectively couplable to the at least one bracket at the second group of linkage member connection points.

9. The hoist of claim 8, wherein the first group of linkage member connection points are laterally outward of the second group of linkage member connection points.

10. The hoist of claim 1, wherein the elongate member includes a plurality of support member connection points spaced axially along a portion of the length thereof.

11. The hoist of claim 10, wherein the elongate member is selectively couplable to the lower portion of the support member at each of the plurality of support member connection points to facilitate balancing the elongate member relative to the support member.

12. The hoist of claim 1, wherein the length of the elongate member is at least the same length as a length of the gas engine assembly.

13. The hoist of claim 1, wherein the length of the elongate member is less than a length of the gas engine assembly.

14. A bracket for an engine hoist, the bracket comprising:
a first side portion including a first plurality of linkage connection points;
a second side portion including a second plurality of linkage connection points;
a flange extending along and connecting the first side portion and the second side portion; and
a securing member including:
a flange receiving portion having a slot configured to receive the flange; and
a U-shaped receiving portion having opposing legs that define a central cavity arranged to receive an elongate member, each of the legs having a slot that receives one of the first or second side portions.

15. The bracket of claim 14, wherein the first side portion slidably engages with a first side of the elongate member, and the second side portion slidably engages with a second, opposite side of the elongate member.

16. The bracket of claim 14, wherein the first side portion and the second side portion define a gap therebetween, the gap sized and shaped to receive and slidably engage the elongate member.

17. The bracket of claim 14, wherein a first group of linkage member connection points is selectively couplable to a first plurality of linkage members, and wherein the first group of linkage member connection points is positioned laterally outward of a second group of linkage member connection points.

18. The bracket of claim 14, wherein the U-shaped receiving portion includes at least a first aperture for receiving a first fastener, the first aperture and the first fastener for fixing the bracket in a position relative to the elongate member.

19. The bracket of claim 14, wherein the flange receiving portion includes at least a first aperture for receiving a first fastener, the first aperture and the first fastener for fixing the bracket in a position relative to the elongate member.

20. A method for assembling a hoist for use with a gas engine assembly, the method comprising:
providing a support member including an upper portion, a lower portion, and an arcuate portion extending therebetween, wherein the support member is C-shaped;
coupling an elongate member to the lower portion of the support member, the elongate member extending substantially orthogonally to the lower portion;
slidably engaging at least one bracket with the elongate member, the at least one bracket being axially translatable along a length of the elongate member and including opposing legs defining a cavity sized to receive the elongate member; and
coupling a plurality of linkage members to the at least one bracket, each linkage member of the plurality of linkage members configured to attach to the gas engine assembly.

* * * * *